US012325611B2

(12) United States Patent
Bizzozero et al.

(10) Patent No.: US 12,325,611 B2
(45) Date of Patent: Jun. 10, 2025

(54) LIFTING DEVICE FOR LIFTING A PAYLOAD WITHIN AN ELEVATOR SHAFT IN A CONTROLLABLE MANNER

(71) Applicant: Inventio AG, Hergiswil (CH)

(72) Inventors: Gabriele Bizzozero, Gisikon (CH); Stefan Weber, Niederwil (CH)

(73) Assignee: INVENTIO AG, Hergiswil (CH)

(*) Notice: Subject to any disclaimer, the term of this patent is extended or adjusted under 35 U.S.C. 154(b) by 332 days.

(21) Appl. No.: 17/758,715

(22) PCT Filed: Jan. 20, 2021

(86) PCT No.: PCT/EP2021/051177

§ 371 (c)(1),
(2) Date: Jul. 13, 2022

(87) PCT Pub. No.: WO2021/148456

PCT Pub. Date: Jul. 29, 2021

(65) Prior Publication Data

US 2023/0042428 A1 Feb. 9, 2023

(30) Foreign Application Priority Data

Jan. 20, 2020 (EP) .................................... 20152594

(51) Int. Cl.
*B66C 15/02* (2006.01)
*B66B 9/00* (2006.01)
(Continued)

(52) U.S. Cl.
CPC ............ *B66C 15/02* (2013.01); *B66B 19/002* (2013.01); *B66C 25/00* (2013.01); *B66B 9/00* (2013.01)

(58) Field of Classification Search
CPC ........... B66B 19/002; B66B 5/12; B66B 9/00; B66C 15/02; B66C 25/00; B66D 1/54
See application file for complete search history.

(56) References Cited

U.S. PATENT DOCUMENTS 765,791 A * 7/1904 Rice .......................... B66B 5/18 187/350
8,291,568 B2 * 10/2012 Barneman ............... B66B 19/00 29/431

(Continued)

FOREIGN PATENT DOCUMENTS

CN 203158955 U 8/2013
CN 106276619 A 1/2017

(Continued)

OTHER PUBLICATIONS

Construction Safety Association of Ontario, Elevator/Escalator Health and Safety Manual, Sep. 2008, pp. 1-38, www.csao.org, Etobicoke, Ontario, Canada.

*Primary Examiner* — Minh Truong
*Assistant Examiner* — Michelle M Mudwilder
(74) *Attorney, Agent, or Firm* — William J. Clemens; Shumaker, Loop & Kendrick, LLP

(57) ABSTRACT

A lifting device for lifting a payload within an elevator shaft in a controllable manner has a platform to be fixed in the elevator shaft, a holding device to be fixed to the payload, a lifting cable attached to the holding device, a securing cable secured to the holding device (such as, for example, a pulling device secured to the platform), and a catching device secured to the platform. The pulling device actively and controllably displaces the lifting cable relative to the platform. The lifting device displaces the securing cable in the event of a relative movement between the holding device and the platform such that the securing cable remains tensioned. The securing cable and the catching device are configured such that the catching device blocks a further relative movement between the securing cable and the catching device in the event that the lifting cable fails.

13 Claims, 4 Drawing Sheets

(51) Int. Cl.
*B66B 19/00* (2006.01)
*B66C 25/00* (2006.01)

(56) References Cited

U.S. PATENT DOCUMENTS

| | | | | |
|---|---|---|---|---|
| 9,834,415 | B2 * | 12/2017 | Hense | B66B 19/00 |
| 10,294,076 | B2 * | 5/2019 | Wurth | B66B 5/04 |
| 11,897,728 | B2 * | 2/2024 | Kattainen | B66B 5/185 |
| 2012/0006630 | A1 * | 1/2012 | Wang | B66B 5/044<br>187/350 |
| 2018/0273349 | A1 | 9/2018 | Weibel et al. | |
| 2021/0016997 | A1 * | 1/2021 | Haag | B66B 19/002 |

FOREIGN PATENT DOCUMENTS

| | | | | | |
|---|---|---|---|---|---|
| CN | 108367897 | A | | 8/2018 | |
| CN | 110526147 | A | * | 12/2019 | B66D 1/12 |
| DE | 2445374 | A1 | | 4/1976 | |
| EP | 2636629 | A1 | | 9/2013 | |
| EP | 2719652 | A1 | | 4/2014 | |
| EP | 3575260 | A1 | | 12/2019 | |
| JP | H03264482 | A | | 11/1991 | |
| JP | H06219665 | A | * | 8/1994 | |
| JP | H0755777 | B2 | * | 6/1995 | |
| KR | 20190012506 | A | | 2/2019 | |
| WO | WO-2006022406 | A1 | * | 3/2006 | B66B 19/005 |
| WO | WO-2010010226 | A1 | * | 1/2010 | B66B 19/00 |
| WO | 2015003964 | A1 | | 1/2015 | |
| WO | WO-2017203633 | A1 | * | 11/2017 | B66B 19/002 |
| WO | 2019122183 | A1 | | 6/2019 | |

* cited by examiner

LIFTING DEVICE FOR LIFTING A PAYLOAD WITHIN AN ELEVATOR SHAFT IN A CONTROLLABLE MANNER

FIELD

The present invention relates to a lifting device for lifting a payload within an elevator shaft in a controllable manner and to an elevator system equipped therewith.

BACKGROUND

Elevator systems are known which can already be operated while a building which is to be provided with the elevator installation is still under construction. Such elevator systems are sometimes also referred to as climb elevators. In this case, a lower part of an elevator shaft can already be completed and an elevator car can be displaced in this lower elevator shaft part, while an upper part of the elevator shaft is not yet completed. The elevator car can thus already be used in a construction phase of the building, for example to transport construction workers and/or building material between the lower floors of the building. A possible embodiment is described in EP 2 636 629 A1 by way of example.

Furthermore, it is also known that objects have to be conveyed also in the upper part of the building during the construction phase. For example, it may be desirable to move building material within the partially completed upper part of the elevator shaft. For this purpose, a lifting device can be installed inside the upper part of the elevator shaft, which lifting device has a pulling device, for example in the form of a cable winch with the aid of which a payload can be lifted and lowered inside the elevator shaft.

However, it must be ensured that any objects falling from the lifting device do not endanger the elevator car located further below or even the passengers located in it.

Therefore, WO 2015/003964 A1 describes a fall protection for a platform, which fall protection is intended to protect the elevator car from falling objects.

However, such platforms usually only protect against smaller falling objects such as screws, tools, or the like.

However, it may also be desirable during the construction phase to lift heavy objects, for example above 20 kg, inside the elevator shaft. For example, it may be necessary to lift a guide rail element in the elevator shaft in order to be able to extend a guide rail of the elevator system upward, so that the elevator system can more or less “grow” with the building. In KR 10-2019-0012506, a holding device is described by way of example, with the aid of which a guide rail element can be connected to a lifting cable in order to be able to pull up the guide rail element with the lifting cable using a pulling device inside the elevator shaft.

If such a heavy object were to become detached unintentionally and fall in the direction of the elevator car located underneath, it would with high probability penetrate any platforms or a car roof and thus pose a great danger to passengers.

Therefore, conventionally, such heavy objects are typically lifted using two independent pulling devices, i.e. two separate cable winches for example, so that if one of the pulling devices fails, the object is still held at least by the other pulling device and prevented from falling.

However, the provision of two pulling devices generally represents an additional outlay in terms of equipment and thus results in additional costs. In addition, the two pulling devices should be operated in synchronism with one another, which requires additional outlay.

There may be a need, among other things, for a lifting device for lifting a payload in a controllable manner within an elevator shaft, which lifting device is simple and/or inexpensive to construct and/or is simple and reliable to operate. Furthermore, there may be a need for an appropriately equipped elevator system.

SUMMARY

Such a need can be met by the lifting device and the elevator system according to the advantageous embodiments that are defined in the following description.

According to a first aspect of the invention, a lifting device for lifting a payload within an elevator shaft in a controllable manner is described, the lifting device having a platform to be fixed in the elevator shaft, a holding device to be fixed to the payload, a lifting cable which is attached to the holding device, a pulling device which is secured to the platform, a securing cable interacting with the holding device at a first coupling point and with the platform at a second coupling point, and a catching device. The pulling device is designed to actively and controllably displace the lifting cable relative to the platform. The lifting device is designed to displace the securing cable relative to the catching device in the event of a relative movement between the holding device and the platform such that the securing cable remains tensioned between the first and the second coupling point. The securing cable and the catching device are designed such that the catching device blocks a further relative movement between the securing cable and the catching device in the event that the lifting cable fails.

According to a second aspect of the invention, an elevator system is described which has an elevator car to be displaced within a lower region in an elevator shaft and a lifting device arranged above the lower region according to an embodiment of the first aspect of the invention.

Possible features and advantages of embodiments of the invention can be considered, inter alia and without limiting the invention, to be based upon the concepts and findings described below.

In short, with the lifting device described herein, a payload to be lifted can be fixed to a holding device which in turn is held both by the lifting cable and secured by the securing cable. The lifting cable can be actively displaced using the pulling device fixed to the platform in order to lift the payload within the elevator shaft. In contrast, the securing cable is not used to actively displace the payload, but only to protect the payload actively displaced with the lifting cable from falling, for example in the event that the lifting cable fails, in particular if the lifting cable tears. In other words, the securing cable is not displaced with its own pulling device which would be able to actively lift the payload by itself via the lifting cable. Instead, the securing cable is only kept under tension, i.e. is displaced in such a way, for example, that it does not sag. The securing cable acts together with the catching device. This catching device is designed, for example, to prevent the securing cable from moving excessively quickly relative to the catching device. The catching device can thus prevent the securing cable from accelerating sharply and beyond the speed limit value together with the falling payload, for example in the event that the lifting cable fails. By blocking the relative movement of the securing cable in relation to the catching device, it is thus possible to prevent the payload from falling.

In the following, properties of the lifting device proposed herein and of its components as well as its embodiments are described in more detail.

The lifting device is intended to move, in particular to lift, heavy payloads, in particular in an upper part of an elevator shaft which may only be partially completed. A payload can have a weight of more than 20 kg, for example, preferably more than 50 kg or even more than 100 kg. In particular, heavy rail elements can be lifted as a payload, which typically have a weight of well over 100 kg.

For this purpose, the lifting device has a platform that can be fixed inside the elevator shaft. A fixation of the platform can be designed such that the fixation can be detached reversibly in order to be able to displace the platform to a higher part of the elevator shaft and fix it there again as soon as the elevator shaft has been structurally extended upward. The platform can be temporarily anchored in the elevator shaft with screws, for example. Force-locking splaying of the platform in the elevator shaft is also conceivable in order to temporarily fix the platform in place in the elevator shaft. On the other hand, the fixation should be designed in such a way that the platform remains securely anchored in the elevator shaft even when loaded with the weight of the payload. The platform can be designed, for example, with structural elements such as beams, holding profiles, and the like, which structural elements have load-bearing capacity. In particular, the platform can have load-bearing steel beams.

In order to be able to lift the payload, the lifting device has a holding device that can be fixed to the payload at least temporarily. The holding device should be structurally designed in such a way that it can withstand the weight forces of the payload to be lifted. In particular, the holding device can be designed so that it can be coupled to the payload in a simple and rapid manner. For this purpose, the holding device can have a structure or geometry with which it can be easily but reversibly connected to the payload. For example, the holding device can have a shape complementary to the payload in order to be able to be coupled to the payload in a form-fitting manner. Furthermore, the holding device can be designed in such a way that both the lifting cable and the securing cable can be secured to it in a simple and reliable manner.

The lifting cable is intended to be able to lift the holding device together with the payload secured to it. For this purpose, the lifting cable should have sufficient mechanical strength or load-bearing capacity in order to be able to withstand at least the weight of these two components, but preferably also forces that go beyond this, such as can occur when the two components are accelerated. In particular, the lifting cable should be able to withstand forces of, for example, more than 1 kN, preferably more than 5 kN, or even more than 10 kN. The lifting cable can have transverse dimensions, i.e. a diameter in the case of a round cable, of a few millimeters, for example between 2 mm and 20 mm, preferably between 5 mm and 10 mm.

The term "cable" is to be interpreted broadly in this case and is to be understood as representing elongate components that can withstand tensile loads and can be moved transversely to the direction of tension. Thus, a "cable" can also be designed like a belt or strap. The lifting cable can be composed of a large number of metallic strands as a steel cable or generally as a metal cable. Alternatively, the lifting cable can also be a textile cable which has high load-bearing capacities and is composed of fibers.

The pulling device is used to actively and controllably displace the lifting cable together with the holding device fixed to it and the payload which in turn is fixed to it. For this purpose, the pulling device should be able to exert sufficiently high forces on the lifting cable in order to be able to move it upward, together with the payload held on it, within the elevator shaft and, if necessary, also to be able to brake it downward again. In other words, the pulling device should not only be able to hold the weight of the payload, including the weight of the holding device, but also be able to displace these components upward against their weight. In this case, the pulling device can preferably effect lifting speeds of more than 0.1 m/s, preferably more than 0.3 m/s, or even more than 1 m/s. For this purpose, the pulling device has an active drive. The active drive can exert the desired force on the lifting cable. The drive can have an electric motor, for example. Possibly, the drive can also have a gear to translate the driving force. The drive can be activated and deactivated in a controlled manner and its drive speed can be changed if necessary. For this purpose, the pulling device can have a controller. The drive can, for example, drive a pulley onto which the lifting cable can be wound. Accordingly, the drive can be designed as a type of cable winch, in particular a drum winch. Alternatively, the drive can drive a pulley or a pulling sheave, over or along the surface of which the lifting cable runs, and a desired traction is brought about between the lateral surface and the lifting cable due to the resulting friction. In particular, the pulling device can be designed as a continuous cable winch. Such a cable winch is sometimes also referred to as a Tirak (Tirak is a registered trademark used on hoists by Tractel, located in Foetz, Luxembourg).

The securing cable can be designed similarly or identically to the lifting cable. In particular, the securing cable should also have at least a carrying capacity that is sufficient to hold the total weight of the payload and the holding device. For example, the securing cable should have a carrying capacity of at least 2 kN, preferably at least 5 kN, or at least 10 kN. Preferably, the carrying capacity of the securing cable should even be high enough to be able to withstand dynamic forces, such as those that can occur if, for example, the lifting cable fails and the payload falls or swings briefly, so as to be intercepted by the securing cable.

The holding device may comprise a shackle and the securing cable may be attached to the same shackle to which the lifting cable is attached.

At least some partial regions of the securing cable run between the first coupling point and the second coupling point. At the first coupling point, the securing cable is secured to the holding device or at least held on it, so that forces can be transferred from the securing cable to the holding device. At the second coupling point, the securing cable is secured to the platform or at least held on it, so that forces can be transferred from the securing cable to the platform. Further components can be arranged between the securing cable and the holding device or the platform, via which components forces can be transferred between the securing cable and the holding device or the platform. In particular, the securing cable can interact with the catching device and transfer forces to it, and the catching device itself can be secured to the platform, with the securing cable being fastened to the holding device with an opposite end, for example. Alternatively, the catching device can be secured to the holding device so that the securing cable can transfer forces to the holding device by interacting with the catching device, wherein the securing cable can be attached to the platform with an opposite end, for example.

The catching device is designed to quickly block a relative movement between the securing cable and the catching device if the lifting cable should fail and the payload is therefore only hanging on the securing cable. By blocking the securing cable in a targeted manner, movement of the securing cable and the payload secured to it relative to the catching device secured to the platform fixed in the elevator shaft can be prevented, and the payload can thus be prevented from falling.

For example, the securing cable and the catching device can be designed such that the catching device blocks further relative movement between the securing cable and the catching device if a relative speed between the securing cable and the catching device exceeds a predetermined speed limit value. The catching device preferably interacts with the securing cable in such a way that the securing cable can be moved relative to the catching device at a relatively low speed. However, if the relative speed increases excessively, a mechanism is activated in the catching device, with the aid of which the further relative movement between the securing cable and the catching device is blocked, i.e. is at least braked heavily or preferably braked to a standstill.

For example, the catching device can be designed to be small, light, and compact and can be secured to the platform of the lifting device. The securing cable can run through the catching device. If the speed of the movement of the securing cable exceeds a set value, the catching device closes automatically and safely catches a load. The securing cable can be held between clamping jaws, for example, which prevent it from slipping further. A surface of the clamping jaws can be sufficiently large in this case so that the securing cable is not damaged. A design of the catching device can ensure that, the more load pulls on the securing cable, the more firmly the clamping jaws will hold. Typically, the catching device is tested with a multiple of its nominal load, for a multiple of safety. This safety can be confirmed, for example, with certification in accordance with a European standard EN 1808 by an independent certification body.

According to a specific embodiment, the catching device can be designed in such a way that the speed limit value of the catching device is greater than a maximum speed to be controlled at which the pulling device can displace the lifting cable.

In other words, the catching device can be structurally or functionally configured in such a way that it blocks the relative movement between the securing cable and the catching device as soon as the securing cable moves faster than the pulling device can move the lifting cable. If the securing cable moves faster than the maximum speed of the displacement of the lifting cable, which speed can be effected by the pulling device, this indicates that the lifting cable has snapped and the holding device, which is now only held by the securing cable, together with the payload, is accelerating the securing cable to an overspeed. In this case, the catching device can brake and ultimately stop the onset of free fall of the payload by blocking the displacement movement of the securing cable.

In an alternative embodiment, the catching device can activate its brake shoes not by detecting an overspeed, but by sensing the lifting cable. The catching device can be kept open, for example, by means of a lever that is supported on the lifting cable, for example, with a pulley. If the lifting cable tears, there is no support and the catching device closes its brake shoes and thus blocks further relative movement between the lifting cable and the catching device.

In the two configurations described above, such a catching device can sometimes also be referred to as a Blocstop® load arrester (available from Tractel, located in Foetz, Luxembourg).

In order to prevent the holding device and the payload secured to it from starting to fall freely if the lifting cable fails, until the securing cable intercepts the free fall, the lifting device is designed in such a way that the securing cable always remains tensioned if the holding device moves due to a traction relative to the platform on the lifting cable caused by the pulling device. In other words, a suitable design of components of the lifting device ensures that the securing cable never sags slackly, but rather is always at least slightly tensioned, even when the holding device secured to one end moves relative to the platform of the lifting device holding the catching device. In the event that the lifting cable suddenly fails, the securing cable does not have to be tensioned first or the payload does not first fall a little until the securing cable tensions. Accordingly, in particular, excessive dynamic forces can be avoided when catching such a free fall.

Such a continuous tensioning of the securing cable can be technically implemented in different ways.

For example, according to one embodiment, the lifting device can also have a deflection device secured to the platform. The securing cable can run from a first end secured to the holding device upward to the deflection device and from there downward again to a second end. A counterweight can then be secured to the second end of the securing cable.

In other words, a deflection device can be provided on the platform of the lifting device, over which the securing cable can run and be deflected in the process. The deflection device can be a deflection roller or a deflection disk, for example. The securing cable can run along a lateral surface of the deflection device. The deflection device can be mounted so as to be rotatable about an axis.

The first end of the securing cable is secured to the holding device and is therefore at least partially loaded with the weight of the holding device and the payload secured to it. A counterweight is provided on the securing cable at the opposite second end. The counterweight ensures that the securing cable is always subjected to sufficient traction to prevent it from sagging and thus to keep it tensioned. In other words, due to the forces acting on the securing cable at the two opposite ends and acting in parallel directions, the securing cable is loaded with a corresponding force on the deflection device and is accordingly always subjected to a traction and thus kept taut.

However, the force caused by the counterweight should be significantly less than the force to be brought about by the pulling device via the lifting cable on the holding device. For example, the counterweight should weigh significantly less than 50%, preferably less than 20%, of the payload to be lifted.

A continuous tensioning of the securing cable using the described arrangement of deflection device and counterweight is technically simple, inexpensive, and reliable to implement.

According to a more specific embodiment, a weight of the holding device can be greater than a sum of a weight of the counterweight and a weight of the securing cable.

In other words, the weight of the counterweight should be dimensioned in such a way that, on the one hand, it can reliably keep the securing cable under tension. On the other hand, however, the weight of the counterweight should not be greater than the weight of the holding device minus the weight of the securing cable, otherwise it may be difficult or even impossible to lower the holding device back down after the payload has been lifted upward with its help and then separated from the holding device. Preferably, the weight of the holding device should be at least 10% greater than the sum of the weight of the counterweight and the weight of the securing cable.

According to an alternative embodiment, the securing cable can be tensioned between the second coupling point on the platform and a position arranged below the catching device, wherein the catching device can be secured to the holding device and can interact there as the first coupling point with the securing cable.

In other words, the securing cable can be attached to the platform with an upper end and can hang down from there. A lower end can, for example, be weighed down with a weight or secured to another component of the elevator system arranged below the platform, so that the securing cable is kept under tension overall. The securing cable can interact with the catching device between the upper end and the lower end. The catching device can be attached to the holding device. The catching device can be lifted together with the payload by lifting the lifting cable and be moved vertically upward along the securing cable. In the event that the lifting cable fails, in particular tears, the payload is then held on the securing cable together with the holding device and the spontaneously locking catching device and is thus protected from falling. In such an embodiment, the securing cable can be installed relatively easily in the lifting device or the elevator system.

According to yet another alternative embodiment, the securing cable may be secured to the platform at a first end and an opposite second end. The lifting device can then also have a deflection device which is secured to the platform and over which the securing cable runs. The catching device can then be secured to the holding device and interact there as a first coupling point with a first region of the securing cable running between the first end and the deflection device. The securing cable can be weighted down and kept under tension by a counterweight acting in a second region between the deflection device and the second end.

In other words, the securing cable can be held on the platform similarly to a 2:1 suspension. Between the first end secured to the platform and the region running over the deflection device, the securing cable runs downward to the catching device. Between the region running over the deflection device and the second end, the securing cable runs toward a counterweight attached to the securing cable. The counterweight always keeps the securing cable under tension. Similarly to the previously described embodiment, the catching device can move together with the payload and the holding device, while being lifted by the lifting cable. Should the lifting cable tear, the securing cable can prevent the payload from falling. In many cases, the securing cable can even prevent falling if the securing cable also tears in a partial region, in particular if the catching device is designed to block in both movement directions of the securing cable relative to the catching device at overspeed.

Furthermore, according to one embodiment, the catching device can be designed to block further relative movement between the securing cable and the catching device only when the relative speed between the securing cable and the catching device exceeds the specified speed limit value in a movement direction in which the holding device secured to the securing cable is displaced downward.

In other words, the catching device can be configured to block the relative movement between the securing cable and the catching device only when the securing cable is moved in a direction in which the holding device secured to it is moved downward, and the predefined speed limit value is exceeded in the process. In the opposite direction, i.e. when the holding device moves upward, the catching device generally does not need to be able to block. As a result, a structural design of the catching device can be simplified.

In an embodiment of the elevator system according to the second aspect of the invention, the elevator system can already be operable before the completion of the elevator shaft in order to displace the elevator car and to lift payloads above the elevator car by means of the lifting device.

In other words, the proposed elevator system can be a climb elevator that can already be used before the elevator shaft or the building accommodating the elevator shaft is completed. On the one hand, the elevator car can be displaced in this case within a lower region of the elevator shaft in order to be able to transport people and/or material there. On the other hand, the lifting device described herein can be used in order to be able to transport payloads in a region of the elevator shaft above the lower region, i.e. above the travel region of the elevator car.

Due to the implementation proposed herein, in which the payload is not only held and displaced with the lifting cable but also secured with the securing cable, there is no significant risk of the payload falling uncontrollably and putting at risk the elevator car located below or persons located inside the elevator car.

It must be noted that some of the possible features and advantages of the invention are described herein with reference to different embodiments of the lifting device and the elevator system equipped with the counterweight. A person skilled in the art will recognize that the features may be suitably combined, adapted, or exchanged as appropriate in order to arrive at further embodiments of the invention.

Embodiments of the invention will be described below with reference to the attached drawings; neither the drawings nor the description should be interpreted as limiting to the invention.

The drawings are merely schematic and not true to scale. In the various figures, identical reference signs refer to features which are identical or have an identical function.

DETAILED DESCRIPTION

Figure 1:
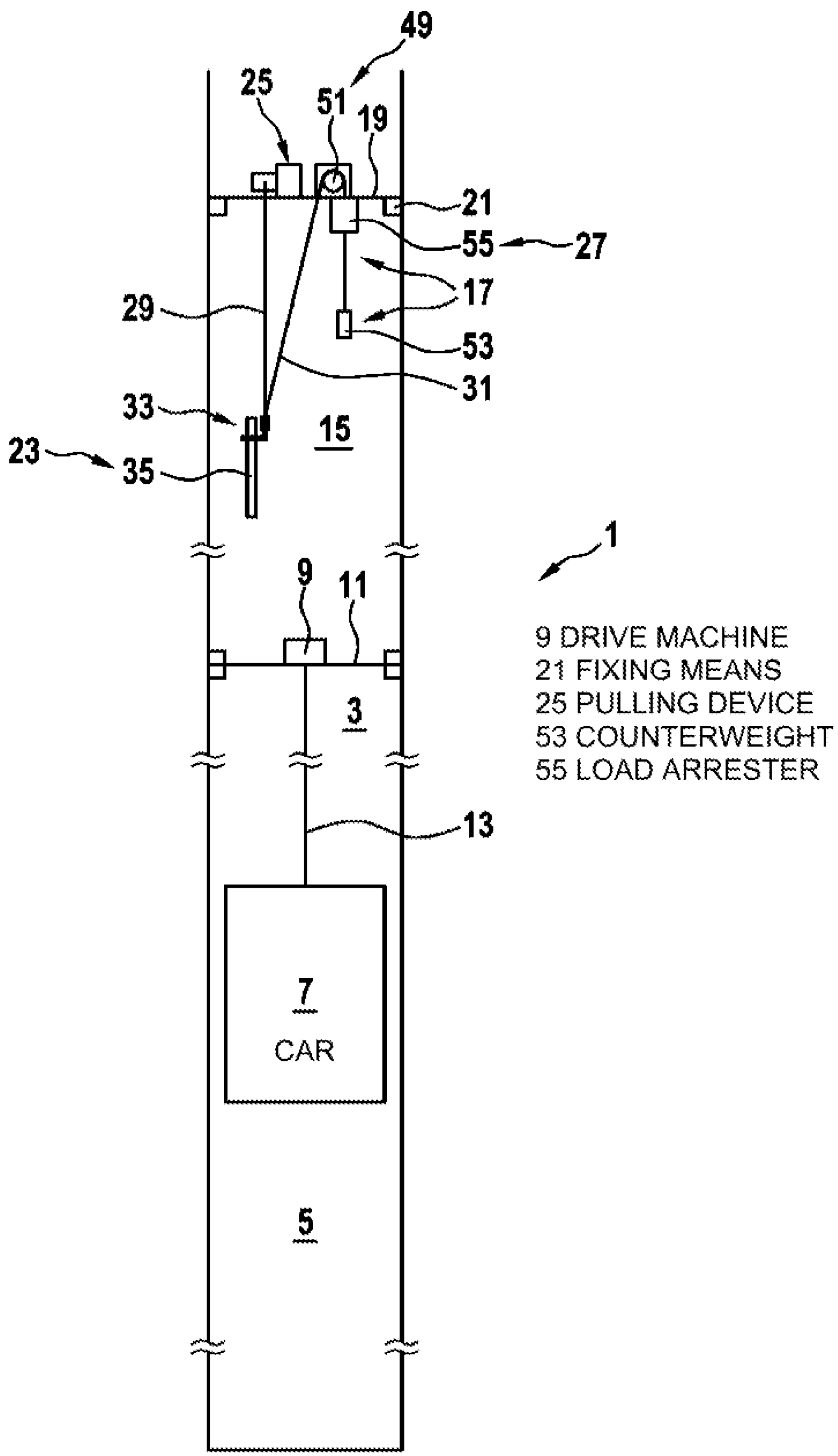
FIG. 1 shows an elevator system comprising a lifting device according to an embodiment of the present invention.

FIG. 1 illustrates an elevator system 1 according to an embodiment of the invention. The elevator system 1 is designed as a climb elevator. In this case, an elevator shaft 3 is not yet completely finished in a building that is still under construction.

In a lower region 5 of the elevator shaft 3, the elevator system 1 is already being operated in order to transport passengers such as construction workers or objects such as building materials between lower floors of the building. For this purpose, the elevator system 1 has an elevator car 7 which can be displaced within the lower region 5 of the elevator shaft 3 using a drive machine 9. For this purpose, the drive machine 9 is held on a platform 11 temporarily fixed in the elevator shaft 3. The drive machine 9 can displace cable-like suspension means 13, on which the elevator car 7 is suspended, upward and downward.

In an upper region 15 of the elevator shaft 3, i.e. above the platform 11 delimiting the lower region 5 at the top, the elevator system 1 has a lifting device 17 according to the invention. Using the lifting device 17, objects can already be conveyed as payloads 23 through the upper region 15 of the elevator shaft 3 during the construction of the building. The lifting device 17 is designed to also lift heavy objects such as guide rail segments 35 weighing more than 100 kg within the upper region 15 of the elevator shaft 3. Precautions are taken to reliably prevent such heavy objects from falling and thus endangering the elevator car 7 located underneath.

For this purpose, the lifting device 17 has an additional platform 19. This additional platform 19 is arranged near an upper end of the at least partially completed elevator shaft 3 and is fixed in the elevator shaft 3. For this purpose, the platform 19 can be temporarily and reversibly detachably anchored in the walls of the elevator shaft 3 using fixing means 21 such as screws, bolts, or the like. Alternatively, the platform 19 can be fixed within the elevator shaft 3 using suitable fixing means 21.

The lifting device 17 also has a pulling device 25 secured to the platform 19, a catching device 27 also secured to the platform 19, a lifting cable 29, a securing cable 31, and a holding device 33.

Figure 2:
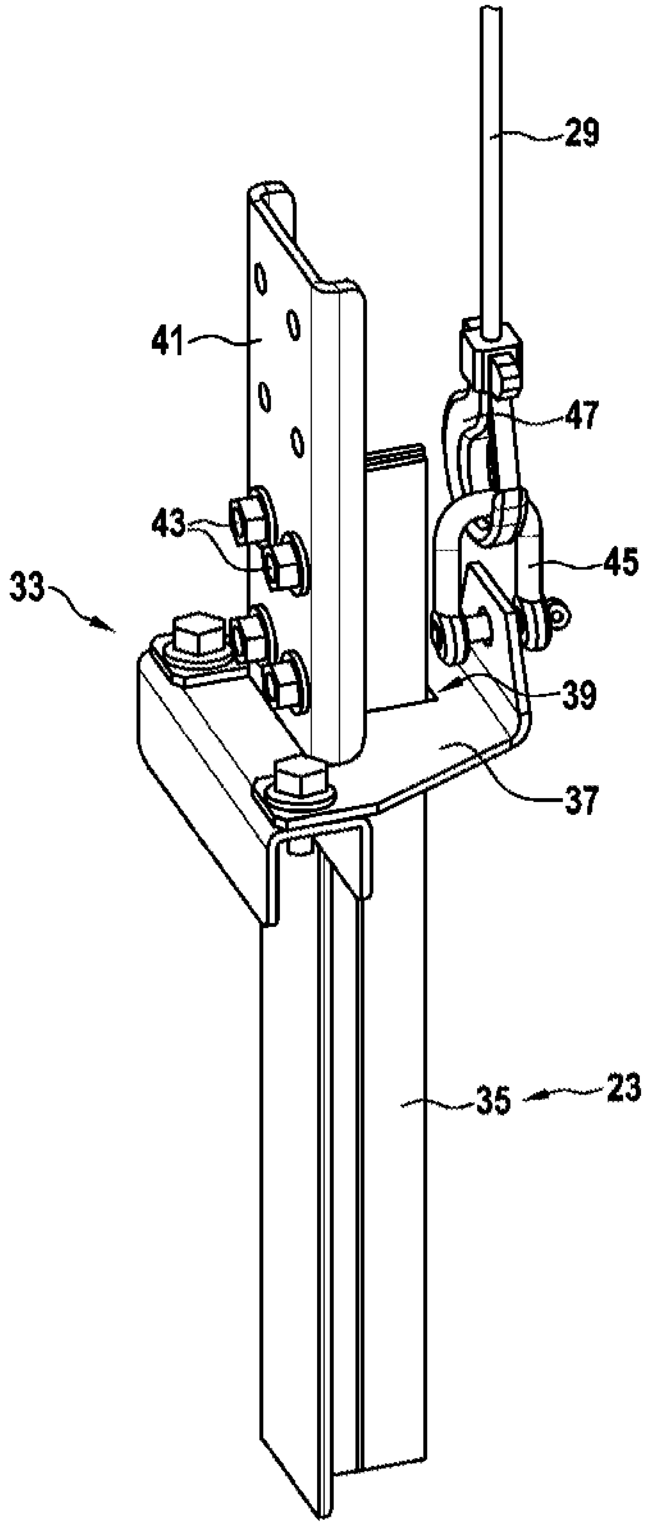
FIG. 2 is an enlarged view of a holding device for a lifting device according to an embodiment of the present invention.

As shown enlarged in FIG. 2 and shown by way of example in a perspective view, the holding device 33 is designed to hold the payload 23, for example in the form of a guide rail segment 35, or to be secured thereto at least temporarily and detachably. For this purpose, the holding device 33 can be formed with an angled sheet metal 37 in which a recess 39 is formed. A shape of the recess 39 can be substantially complementary to a cross-sectional shape of the guide rail segment 35 acting as a payload 23. In the example shown, the sheet metal 37 can be slid with its recess 39 over the guide rail segment 35, and then a stop plate 41 can be temporarily secured to the guide rail segment 35 with screws 43 above the metal sheet 37. The screws 43 can be screwed into drill holes in the guide rail segment 35 which are provided for later attachment of the guide rail segment 35 to the walls of the elevator shaft 3. In this way, the guide rail segment 35 can be fixed to the holding device 33 as a payload 23. Furthermore, the holding device 33 shown has a further bore in which a shackle 45 is held. Using the shackle 45, one end of the lifting cable 29 can be secured to the holding device 33, for example using a carabiner 47.

Starting from the holding device 33, the lifting cable 29 then runs to the pulling device 25 secured to the platform 19. The pulling device 25 is configured to actively and controllably displace the lifting cable 29 relative to the platform 19. For this purpose, the pulling device 25 can be designed as a cable winch, in particular as a continuous cable winch or tirak hoist. An operation of the pulling device 25 can be controlled using a controller (not shown). The lifting cable 29 can be composed of a plurality of steel strands as a steel cable and can have a diameter of 8 mm, for example.

The securing cable 31 provided in addition to the lifting cable 29 in the lifting device 17 is intended to secure the payload 23, i.e. to prevent the payload from falling in the event that the lifting cable 25 fails.

For this purpose, the securing cable 31 is also secured to the holding device 33 with a first end. For example, the securing cable 31 can be attached to the same shackle 45 to which the lifting cable 29 is also attached. Alternatively, a further shackle or the like (not shown) can be secured or arranged on the holding device 33 for this purpose. Starting from the holding device 33, the securing cable 31 then runs upward to a deflection roller 51 serving as a deflection device 49. The deflection device 49 is held on the platform 19 and can rotate about an axis of rotation. The securing cable 31 runs over a lateral surface of the deflection device 49 and then down to a counterweight 53 which is secured to a second end of the securing cable 31. Between the deflection device 49 and the counterweight 53, the securing cable 31 still runs through the catching device 27.

Due to the counterweight 53 and the deflection of the securing cable 31 at the deflection roller 51, the securing cable 31 is thus always kept under tension. In other words, the counterweight 53 ensures that the securing cable 31 never sags slackly even if its opposite end is lifted together with the holding device 33 attached thereto using the lifting cable 29. In particular, a region of the lifting cable 29 running between the holding device 33 and the catching device 27 always remains tensioned.

The catching device 27 is configured for this purpose and interacts with the securing cable 31 in such a way that it does not block any relative movement between the securing cable 31 and the catching device 27 in the event that the lifting cable 29 fails.

For this purpose, the catching device 27 can be designed as a so-called Blocstop load arrester 55. The securing cable 31 runs through such a load arrester 55. The load arrester 55 can be designed in such a way that it directly detects a failure of the lifting cable 29 and then blocks the movement of the securing cable 31. Alternatively, the load arrester 55 may be configured to indirectly detect the failure of the lifting cable 29 by the fact that the securing cable 31 passes through the load arrester 55 at a relative speed exceeding a speed limit value, and then to block the movement of the securing cable 31. The speed limit value can be selected, for example, in such a way that it is greater than a speed at which the pulling device 25 can displace the lifting cable 29 upward as quickly as possible.

Figure 3:
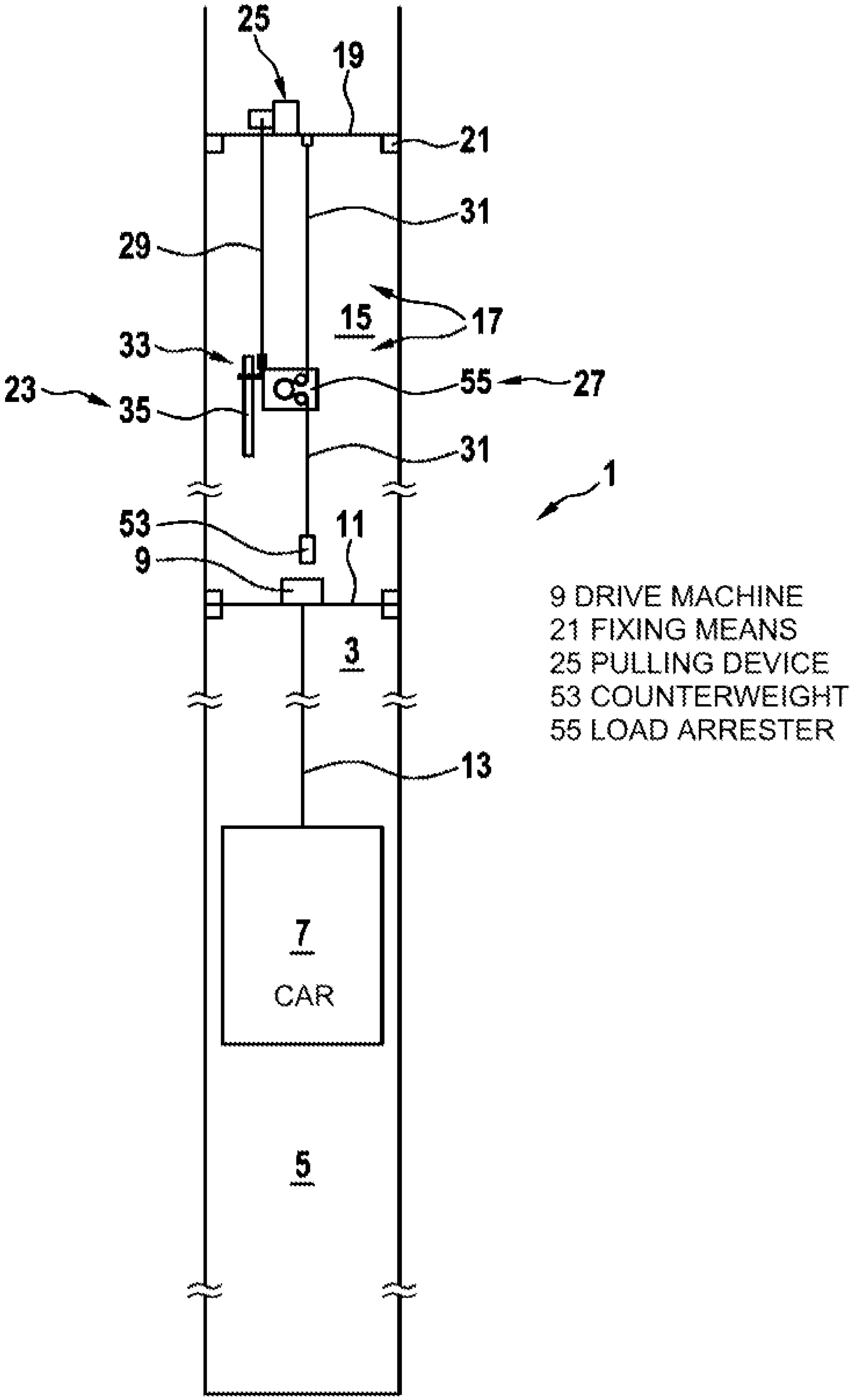
FIG. 3 shows an elevator system comprising a lifting device according to an alternative embodiment of the present invention.

FIG. 3 shows an elevator system 1 with an alternative lifting device 17. In this embodiment, the securing cable 31 is fixed to the platform 19 at one end. An opposite end of the securing cable 31 is loaded with a counterweight 53 so that the securing cable 31 is always kept under tension. Alternatively, the securing cable 31 may have its lower end attached to another elevator component such as the lower platform 11 and be placed under tension. The securing cable 31 runs through a catching device 27 in the form of a load arrester 55 which is secured to the holding device 33. When the holding device 33 is slowly lifted by the pulling device 25 together with the payload 35, the catching device 27 can move along the tensioned securing cable 31. In the event that the lifting cable 29 breaks, the catching device 27 blocks, so that the payload 23 is held on the securing cable 31 via the holding device 33 and the catching device 27 and is prevented from falling. The lifting device 17 having a securing cable 31 running in this way can be installed in a particularly simple manner.

Figure 4:
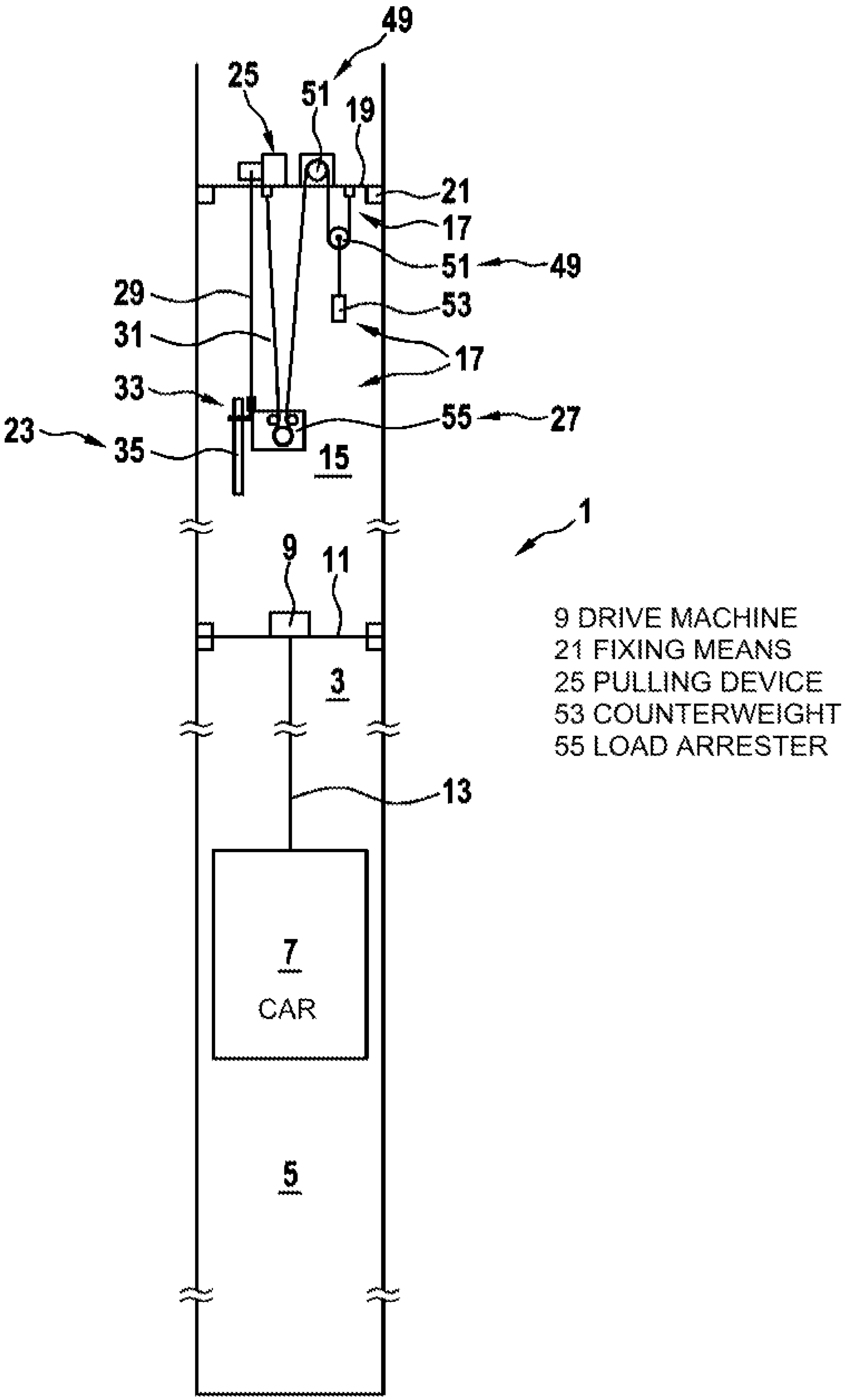
FIG. 4 shows an elevator system comprising a lifting device according to a further alternative embodiment of the present invention.

FIG. 4 shows an elevator system 1 with a further alternative embodiment of a lifting device 17. The securing cable 31 is attached to the platform 19 with its two ends. Furthermore, a deflection device 49 in the form of a deflection roller 51 is arranged on the platform 19. A first region of the securing cable 31 runs between the first end of the securing cable 31 and the deflection roller 51 through the catching device 27 attached to the holding device 33 in the form of a load arrester 55. A second region of the securing cable 31 runs between the deflection roller 51 and the second end of the securing cable 31 and is kept under tension by a counterweight 53 attached to it. With such an embodiment, the securing cable 31 can prevent the payload 35 from falling in many cases even if not only the lifting cable 29 but also the securing cable 31 itself should tear in one of its partial regions.

With embodiments of the lifting device 17 described, payloads 23, in particular heavy guide rail segments 35, can already be conveyed in the upper region 15 of the elevator shaft 3 during the construction phase of a building and in particular while the elevator car 7 is already being used as a means of transport in the lower region 5 of the elevator shaft 3. While the payload 23 is being lifted using the pulling device 25 and the lifting cable 29, the payload 23 is always secured against falling with the aid of the securing cable 31, for example if the lifting cable 29 unexpectedly fails. The securing cable 31 is kept under tension using the counterweight 53 and is blocked in its movement by the catching device 27 in the event of a failure of the lifting cable 29 and is thus fixed relative to the platform 19.

After the payload 23 has been lifted within the elevator shaft 3 to a target height, the holding device 33 can be detached from the payload 23. A weight of the counterweight 53 together with a weight of the securing cable 31 should be smaller than a weight of the holding device 33, in particular in the embodiment shown in FIG. 1, so that the holding device 33 can be lowered in the elevator shaft 3 due to its own weight even after the payload 23 has been detached in order to be able to secure a payload 23 to it again. For example, with a counterweight weighing 8 kg and a securing cable of 40 m in length with a linear weight of 0.5 kg/m, i.e. a securing cable weight of 20 kg, the weight of the holding device 33 can be at least 30 kg.

Finally, it should be noted that terms such as "comprising," "having," etc. do not preclude other elements or steps, and terms such as "a" or "an" do not preclude a plurality. Furthermore, it should be noted that features or steps which have been described with reference to one of the above embodiments may also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An elevator system comprising:

an elevator car displaceable within a lower region in an elevator shaft; and a lifting device arranged in the elevator shaft above the lower region for lifting a payload in a controllable manner, the lifting device comprising:

a platform adapted to be fixed in the elevator shaft;

a holding device adapted to be fixed to a payload;

a lifting cable attached to the holding device;

a pulling device secured to the platform;

a securing cable interacting with the holding device at a first coupling point and with the platform at a second coupling point;

a catching device;

a counterweight attached to the securing cable;

wherein the pulling device actively and controllably displaces the lifting cable relative to the platform;

wherein the lifting device displaces the securing cable relative to the catching device when there is a relative movement between the holding device and the platform such that the securing cable remains tensioned between the first coupling point and the second coupling point by the counterweight; and wherein the catching device blocks a further relative movement between the securing cable and the catching device when the lifting cable fails.

2. The elevator system according to claim 1 wherein the holding device includes a shackle and the securing cable and the lifting cable are attached to the shackle.

3. The elevator system according to claim 1 wherein the catching device is secured to the platform and the securing cable is secured to the holding device.

4. The elevator system according to claim 1 wherein the catching device is secured to the holding device and the securing cable is secured to the platform.

5. The elevator system according to claim 1 wherein the catching device blocks a further relative movement between the securing cable and the catching device when a relative speed between the securing cable and the catching device exceeds a predetermined speed limit value.

6. The elevator system according to claim 5 wherein the predetermined speed limit value is greater than a maximum speed to be controlled at which the pulling device can displace the lifting cable.

7. The elevator system according to claim 1 wherein the lifting device includes a deflection device secured to the platform, wherein the securing cable runs from a first end thereof secured to the holding device upward to the deflection device and from the deflection device downward to a second end of the securing cable, and wherein the counterweight is secured to the second end of the securing cable.

8. The elevator system according to claim 7 wherein a weight of the holding device is greater than a sum of a weight of the counterweight and a weight of the securing cable.

9. The elevator system according to claim 1 wherein the securing cable is tensioned between the second coupling point on the platform and a position below the catching device, and wherein the catching device is secured to the holding device and interacts there as the first coupling point with the securing cable.

10. The elevator system according to claim 1 wherein the securing cable has a first end and an opposite second end, the first and second ends being secured to the platform, wherein the lifting device includes a deflection device secured to the platform and over which deflection device the securing cable runs, wherein the catching device is secured to the holding device and interacts there as the first coupling point with a first region of the securing cable running between the first end and the deflection device, and wherein the securing cable is weighted down and held under tension by the counterweight acting in a second region of the securing cable between the deflection device and the second end.

11. The elevator system according to claim 1 wherein the catching device blocks further relative movement between the securing cable and the catching device only when a relative speed between the securing cable and the catching device exceeds a specified speed limit value in a movement direction in which the holding device secured to the securing cable is displaced downward.

12. The elevator system according to claim 1 wherein the securing cable has a carrying capacity sufficient to hold a total weight of the payload and the holding device.

13. The elevator system according to claim 1 being operable before a completion of the elevator shaft to displace the elevator car and to lift payloads above the elevator car by the lifting device.

* * * * *